(12) United States Patent
Hashimoto et al.

(10) Patent No.: US 7,435,782 B2
(45) Date of Patent: Oct. 14, 2008

(54) ABA TRI-BLOCK COPOLYMER

(75) Inventors: Tamotsu Hashimoto, Fukui (JP);
Takeshi Namikoshi, Fukui (JP); Michio Urushisaki, Fukui (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 11/799,676

(22) Filed: May 2, 2007

(65) Prior Publication Data

US 2008/0114141 A1 May 15, 2008

(30) Foreign Application Priority Data

Nov. 10, 2006 (JP) .............................. 2006-305084

(51) Int. Cl.
*C08F 297/00* (2006.01)
*C08F 4/10* (2006.01)

(52) U.S. Cl. .................... 525/289; 525/299; 525/312
(58) Field of Classification Search ............... 525/289, 525/290, 299, 312
See application file for complete search history.

*Primary Examiner*—Fred M Teskin
(74) *Attorney, Agent, or Firm*—Melvin I. Stoltz

(57) ABSTRACT

An ABA tri-block copolymer represented by the following formula (1)

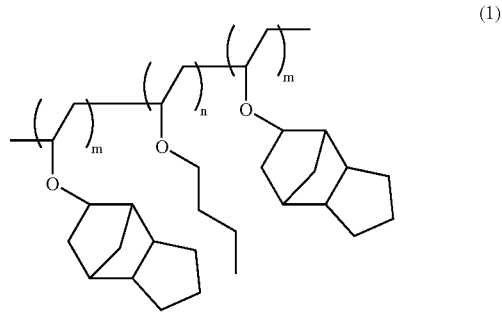

[in the formula (1), n and m are each independently an integer of 30 to 1,000]. The copolymer is a so-called ABA tri-block copolymer between 8-vinyloxytricyclo $[5.2.1.0^{2.6}]$ decane and n-butyl vinyl ether, has rubber elasticity at normal temperature, and has a property of thermoplastic elastomer which has not been possessed by conventional vinyl ether copolymers.

3 Claims, No Drawings

ABA TRI-BLOCK COPOLYMER

BACKGROUND OF THE INVENTION

1. Field of the Invention

The present invention relates to an ABA tri-block copolymer. More particularly, the present invention relates to an ABA tri-block copolymer between a polyvinyl ether having an alicyclic structure in its side chain and a polyvinyl ether having an aliphatic structure in its side chain. The ABA tri-block copolymer is utilized as, for example, a novel thermoplastic elastomer.

2. Description of the Prior Art

Thermoplastic resins which are a polymer derived from a compound having a polymerizable functional group, such as, for example, a styrene, a (meth)acrylate, an olefin, a polyurethane, a vinyl chloride or the like, are being used in a wide variety of applications such as various molded materials, adhesive, coating material and the like. In particular, rubbery elastomers (thermoplastic elastomers) derived from the above monomers are in use for various purposes such as adhesive, building sealant, modifier and the like.

Meanwhile, polymers derived from a vinyl ether having a polymerizable functional group show, in general, a glass transition temperature below room temperature, therefore, have had limited applications.

In the course of development of polymers derived from a vinyl ether, the present inventors found that a vinyl ether copolymer having a glass transition temperature above room temperature can be obtained by using a vinyl ether having an alicyclic structure, and made clear that, in particular, a block copolymer obtained by living cationic polymerization shows two or more glass transition temperatures attributed to each block segments (Non-patent Literature 1).

Non-patent Literature 1: The Society of Polymer Science, Japan, Preprint Vol. 54, No. 2, p. 2497

Therefore, by using a vinyl ether having an alicyclic structure and further using a particular form of polymerization, there may be provided a copolymer having desirable properties in addition to the property of glass transition temperature above room temperature.

SUMMARY OF THE INVENTION

In view of the above-mentioned situation of the prior art, the present inventors made a study. As a result, it was found that, in a so-called ABA tri-block copolymer between 8-vinyloxytricyclo[$5.2.1.0^{2.6}$]decane having an alicyclic structure and n-butyl vinyl ether, there is seen a property which is possessed by thermoplastic elastomers having rubber elasticity but is not possessed by conventional vinyl ether copolymers. A further study was made and the present invention has been completed.

The present invention provides an ABA tri-block copolymer represented by the following formula (1)

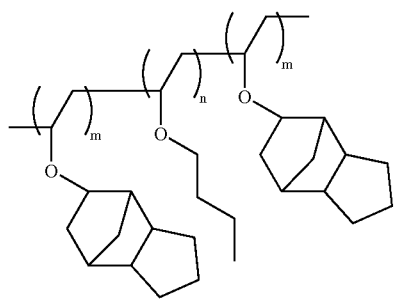
(1)

[in the formula (1), n and m are each independently an integer of 30 to 1,000].

The present copolymer, which is a so-called ABA tri-block copolymer between 8-vinyloxytricyclo[$5.2.1.0^{2.6}$]decane and n-butyl vinyl ether, is provided; and this ABA tri-block copolymer is novel, and has rubber elasticity at normal temperature, and has a property of thermoplastic elastomer which has not been possessed by conventional vinyl ether copolymers.

DETAILED DESCRIPTION OF THE INVENTION

As indicated by the formula (1), the ABA tri-block copolymer of the present invention is a so-called ABA tri-block copolymer which is derived from a vinyl ether having an alicyclic structure (this ether is hereinafter referred to as monomer A) and a vinyl ether having an aliphatic structure (this latter ether is hereinafter referred to as monomer B), which has an alicyclic structure and an aliphatic structure in its side chain, and which has a structure of poly(A)-poly(B)-poly(A).

The monomer A in the present ABA tri-block copolymer is 8-vinyloxytricyclo[$5.2.1.0^{2.6}$] decane represented by the following formula

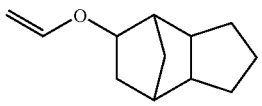

and the monomer B is n-butyl vinyl ether represented by the following formula.

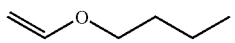

In the formula (1), n and m are each independently an integer of 30 to 1,000; preferably, n is 350 to 1,000 and m is 150 to 1,000. When n is smaller than 350 or m is smaller than 150, the tri-block copolymer tends to have no rubber elasticity at normal temperature, in some cases.

The vinyl ether copolymer of the present invention can be produced by polymerizing, in a solvent, 8-vinyloxytricyclo [$5.2.1.0^{2.6}$] decane (monomer A) and n-butyl vinyl ether (monomer B).

In the present invention, the tri-block copolymer is prepared by living cationic polymerization using a solvent capable of dissolving the monomers used and the copolymer produced. Living cationic polymerization can be employed to control the degree of polymerization easily and is useful for the synthesis of a polymer with a narrow molecular weight distribution. In producing, in particular, a block copolymer, first, the polymerization of a first monomer is completed, and then a second monomer is added continuously, whereby a poly(second monomer) is extended from the terminal of a poly(first monomer) and the length of each segment can be controlled as desired; thus, this polymerization is effective as a technique of obtaining a block copolymer in one pot. A block copolymer obtained by living cationic polymerization has a narrow molecular weight distribution; therefore, its Mw/Mn is close to 1 and its Mn changes proportionally to its degree of polymerization.

As the solvent in the above living cationic polymerization, there can be used, for example, aromatic hydrocarbon solvents such as toluene, xylene and the like, and halogenated hydrocarbons such as methylene chloride and the like.

As the polymerization initiating system in the above living cationic polymerization, those employed in ordinary living cationic polymerization can be used with no particular restriction; and there can be used, for example, an acidic initiating system which is a combination of (iodine or transition metal halide) and (hydrochloric acid, acetic acid or an adduct thereof) and the like. As specific examples of the acidic initiating system, there can be mentioned a $HI/I_2$ initiating system, a hydrogen chloride/zinc chloride initiating system, and an initiating system which is a combination of a tin halide (e.g. tin tetrachloride or tin tetrabromide) and an acetic acid adduct of vinyl ether and the like.

The living cationic polymerization for producing the ABA tri-block copolymer of the present invention is specifically conducted as follows. First, 8-vinyloxytricyclo[$5.2.1.0^{2.6}$]decane (monomer A) is polymerized to an intended polymerization degree in a solvent; then, n-butyl vinyl ether (monomer B) is added to obtain an AB block copolymer. Thereafter, the monomer A is added to obtain an ABA tri-block copolymer.

The thus-obtained ABA tri-block copolymer of the present invention has a property of thermoplastic elastomer. Generally, in thermoplastic elastomers, aggregation of end blocks or mid blocks forms a microphase-separated structure (a sea-island structure); and during the heating or cooling of thermoplastic elastomer, the phenomenon of relaxation or restriction of the molecular movement, including the entanglement between respective segments, is detected as change of rigidity modulus or elasticity modulus of the thermoplastic elastomers. Generally, at about normal temperature, thermoplastic elastomers are in a rubbery state where the modulus of elasticity is not changed by temperature and, at high temperatures, show a property of thermoplastic resin of melting.

The present invention is described in detail below by way of Examples. Incidentally, measurements of molecular weight and molecular weight distribution were determined by gel permeation chromatography (GPC) (elutant: chloroform, polystyrene standard)

EXAMPLE (Synthesis of Tri-Block Copolymer of m=150 and n=700)

8-Vinyloxytriclyclo[$5.2.1.0^{2.6}$]decane (hereinafter referred to as TCDVE in Example and Comparative Examples) was dissolved in dried toluene in a glass-made flask which was thoroughly dried and purged with nitrogen. While the flask contents were being stirred at −30° C., a toluene solution of hydrogen chloride and a diethyl ether solution of zinc chloride ($ZnCl_2$) were dropped into the flask to adjust the initial concentrations to 0.3 M [TCDVE], 2.0 mM [HCl] and 0.5 mM [$ZnCl_2$], and TCDVE was polymerized. To the reaction mixture was added n-butyl vinyl ether (hereinafter referred to as NBVE in Example and Comparative Examples) to give rise to copolymerization. The initial concentration of NBVE, i.e. [NBVE] was 1.4 M. The block copolymer obtained had a number-average molecular weight Mn of 15,200 and a molecular weight distribution Mw/Mn of 1.19 and was an almost monodisperse copolymer.

To the reaction mixture was added TCDVE, and a tri-block copolymer was obtained. The TCDVE concentration after the addition, i.e. [TCDVE]$_{add}$ was 0.3 M. When the monomer was consumed completely, a polymer was allowed to precipitate from the reaction mixture using methanol and recovered. The tri-block copolymer recovered had a number-average molecular weight Mn of 97,000 and a molecular weight distribution Mw/Mn of 1.12.

(Property Measurement)

The tri-block copolymer obtained above was subjected to differential scanning calorimetry (DSC). As a result, the copolymer showed endothermic peaks at −48° C. and 66° C.; that is, two glass transition temperatures unique to block copolymer were observed.

(Measurement of Dynamic Viscoelasticity)

There was used a dynamic viscoelasticity analyzer, RSA-II (produced by Reometrics Co.). A filmy test specimen of 5 mm (width) and 0.6 mm (thickness) was prepared and measured for dynamic viscoelasticity at a specimen measurement length of 22.4 mm (frequency: 1 Hz). As a result, with respect to the storage elastic modulus E', a flat portion was observed at a temperature range of about −20° C. to 60° C. Also, a peak of tan θ was seen at about 40° C., which correlated with lower glass transition temperature observed by DSC.

(Tensile Property Test)

There was used a tensile tester, Tensilon UTM-III-100S (produced by Toyo Baldwin Co.). A filmy test specimen of 5 mm (width) and 0.6 mm (thickness) was prepared and subjected to a tensile test at a specimen measurement length of 20 mm (tensile speed: 10 mm/min, temp: 25° C., humidity: 50%). As a result, a plastic deformation of 90% elongation was seen against a load of 2.4 MP, there was no brittleness of thermoplastic resin, and the useful property of elastomer could be confirmed.

Comparative Example 1

[Synthesis of Random Copolymer (Living Cationic Polymerization)]

20 mmol of NBVE and 80 mmol of TCDVE were dissolved in toluene in a glass-made flask which was purged with nitrogen and sufficiently dried. Then, there were added a toluene solution of an acetic acid adduct of isobutyl vinyl ether (hereinafter referred to as IBEA) and a toluene solution of 2,4-di-tert-butylpyridine. The mixture was cooled to 0° C., followed by addition of a toluene solution of tin tetrabromide ($SnBr_4$), to start polymerization. 5 hours later, the reaction mixture was washed with water, toluene was removed by distillation, and methanol was added to the residue to separate out a copolymer. The copolymer obtained had a number-average molecular weight Mn of 85,000, a molecular weight distribution Mw/Mn of 1.39, and a glass transition temperature of 71° C. as measured by DSC. The copolymer showed no rubber elasticity.

Comparative Example 2

(Synthesis of Di-Block Copolymer)

60 mmol of NBVE was dissolved in toluene in a glass-made flask which was purged with nitrogen and sufficiently dried. Then, there were added a toluene solution of IBEA and a toluene solution of 2,4-di-tert-butylpyridine. The mixture was cooled to 0° C. Thereto was added a toluene solution of tin tetrabromide ($SnBr_4$) to start polymerization. 5 hours later, TCDVE dissolved in toluene was added in an amount equimolar to NBVE, and a reaction was conducted for 5 hours. The reaction mixture was washed with water, toluene was removed by distillation, and methanol was added to the residue to separate out a copolymer. The copolymer had a number-average molecular weight Mn of 26,600 and a molecular weight distribution Mw/Mn of 1.15 as measured by GPC, and showed glass transition temperatures at −52° C. and 77° C. as measured by DSC. With this di-block copolymer, there could be obtained no molded material which allowed measurement of mechanical properties, and there was seen no rubber elasticity.

What is claimed is:

1. An ABA tri-block copolymer represented by the following formula (1)

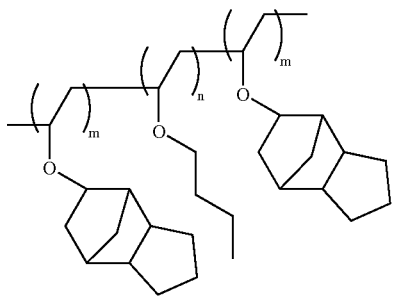

[in the formula (1), n and m are each independently an integer of 30 to 1,000].

2. An ABA tri-block copolymer according to claim 1, wherein n is 350 to 1,000 and m is 150 to 1,000.

3. An ABA tri-block copolymer according to claim 1, which is produced by living cationic polymerization.

* * * * *